United States Patent
Baxter

[11] Patent Number: 5,176,104
[45] Date of Patent: Jan. 5, 1993

[54] FEEDING TROUGH FOR ANIMALS

[75] Inventor: Michael R. Baxter, Kintore, Scotland

[73] Assignee: ACO Polymer Products Limited, Bedfordshire, England

[21] Appl. No.: 460,186
[22] PCT Filed: Jun. 9, 1989
[86] PCT No.: PCT/GB89/00642
§ 371 Date: Feb. 2, 1990
§ 102(e) Date: Feb. 2, 1990
[87] PCT Pub. No.: WO89/11790
PCT Pub. Date: Dec. 14, 1989

[30] Foreign Application Priority Data
Jun. 11, 1988 [GB] United Kingdom ................. 8813881

[51] Int. Cl.$^5$ .............................................. A01K 5/00
[52] U.S. Cl. ................................. 119/52.1; 119/52.4
[58] Field of Search ..................... 119/52.1, 52.4, 53, 119/51.01, 61, 63

[56] References Cited

U.S. PATENT DOCUMENTS

| | | | |
|---|---|---|---|
| 1,895,435 | 1/1933 | Ahrens | 119/52.1 X |
| 2,661,720 | 12/1953 | Rysdon et al. | 119/53 |
| 2,842,096 | 7/1958 | Bradfield | 119/52.4 |
| 3,602,195 | 8/1971 | Blough | 119/521.1 X |
| 3,951,107 | 4/1976 | Doty | 119/52.4 |
| 4,147,132 | 4/1979 | Gilst | 119/53 |
| 4,315,484 | 2/1982 | Kingery | 119/53 |
| 4,505,227 | 3/1985 | Hartke et al. | 119/52.1 |
| 4,949,676 | 8/1990 | Burns | 119/52.1 |

FOREIGN PATENT DOCUMENTS

| | | | |
|---|---|---|---|
| 1344249 | 10/1963 | France | 119/52.1 |
| 2451711 | 10/1980 | France | 119/52.1 |
| 2561067 | 9/1985 | France | 119/52.1 |
| 0700770 | 12/1953 | United Kingdom | 119/63 |
| 2059240 | 4/1981 | United Kingdom | 119/52.1 |

Primary Examiner—Gene Mancene
Assistant Examiner—Todd E. Manahan
Attorney, Agent, or Firm—Walter J. Steinkraus

[57] ABSTRACT

This invention relates to feeding troughs for animals, particularly pigs. The feeding trough has an elongate trough member (10) subdivided by lateral partitions into individual compartments (11). The width (7) of the compartments (11), the height (3) of a front wall (13) of a trough over which the animal's head extends, and a canopy (15, 16) which restricts the space within the compartment into which the animal's head can reach are all designed ergonomically with respect to a range of animals intended to use the trough. The base of the trough is at floor level (18) and the front wall (13) extends from said floor level (18) to a predetermined minimum brisket height (3) of a predetermined smallest size of pig intended to feed. The trough member has an inner front wall (14) which extends angularly downwards and inwards of the trough to terminate at floor level (18) and an inner rear wall (17) which extends angularly downwards to terminate at a predetermined height above floor level at said mean reach. A canopy (15, 16) overlying the trough member and extends inwards and downwards to meet the inner rear wall (17) at the predetermined mean neck angle of the mean weight of pig at a position equal to the maximum nose-to-crown length of the predetermined largest pig. Partitions are spaced along the trough at intervals equal to the maximum shoulder width of the largest pig. Mathematical expressions have been derived to enable the dimensions to be calculated knowing the weight of pig and the height above the floor of the feed.

6 Claims, 2 Drawing Sheets

7) $SW_{95}(mm) = 244.4 + 59.9(W^{0.34} - 4.08) + 1.96\sqrt{0.89^2 + (0.16(W^{0.34} - 4.08))^2}$ 3) $BH_5(mm) = \left[239.6 + 10.20\left(\frac{H + 7.5W^{0.33}}{12W^{0.33}} - 3\right)\right]\left[\left(\frac{W^{0.27}}{2.98}\right) - 1.96\sqrt{\left(2.47 \times \frac{W^{0.27}}{2.98}\right)^2 + \left[0.368\left(\frac{H + 7.5W^{0.33}}{12W^{0.33}} - 3\right)\right]^2 \left(\frac{W^{0.27}}{2.98}\right)^2}\right]$ 4) $RE_{50}(mm) = \left[311.7 + 17.53\left(\frac{H + 7.5W^{0.33}}{12W^{0.33}} - 3\right)\right]\left(\frac{W^{0.42}}{5.85}\right)$ 1) $NC_{95}(mm) = 234.4 + 90.1(W^{0.24} - 2.68) + 1.96\sqrt{2.38^2 + (4.83(W^{0.24} - 2.68))^2}$ 5) $NA_{50}(°) = 34.5 - 8.04\left(\frac{H + 7.5W^{0.33}}{12W^{0.33}} - 3\right)$ 6) $HA_{50}(°) = 78.5 - 4.15\left(\frac{H + 7.5W^{0.33}}{12W^{0.33}} - 3\right)$

Fig. 3

FEEDING TROUGH FOR ANIMALS

This invention relates to feeding troughs for animals particularly, but not exclusively, for pigs.

Problems with known feeding troughs particularly for pigs are spillage of feed, unequal intake of feed, aggression during feeding and fouling of the feed. These problems arise at least partly because of poor feeder design which takes no account of the size and shape of pigs whilst feeding nor of their feeding and social behaviour.

An object of this invention is to obviate or mitigate the aforesaid disadvantages.

According to one aspect of the present invention there is provided a feeding trough for animals comprising an elongate trough member sub-divided by vertical partitions into individual compartments, the width of the compartments, the height of a front wall of the trough over which the animal's head extends, and a canopy which restricts the space within the compartment into which the animal's head can reach, all being designed erogonomically with respect to a range of animals intended to use the trough.

According to another aspect of the present invention there is provided a feeding trough for animals comprising an elongate trough member, the base of which is at floor level and the front wall of which extends from said floor level to a predetermined minimum brisket height of a predetermined smallest size of the type of animal intended to feed, said trough member having an inner front wall which extends angularly downwards and inwards of the trough to terminate at floor level and an inner rear wall which extends angularly downwards to terminate at a predetermined height above floor level at said mean reach, a canopy overlying the trough member and extending inwards and downwards to meet the inner rear wall at the predetermined mean neck angle of the mean weight of animal at a position equal to the maximum nose-to-crown length of the predetermined largest animal and partitions spaced along the trough at intervals equal to the maximum shoulder width of the largest animal.

An embodiment of the present invention will now be described, by way of example, with reference to the accompanying drawings, in which:

FIG. 3 is a set of formulae.

Figure 1:
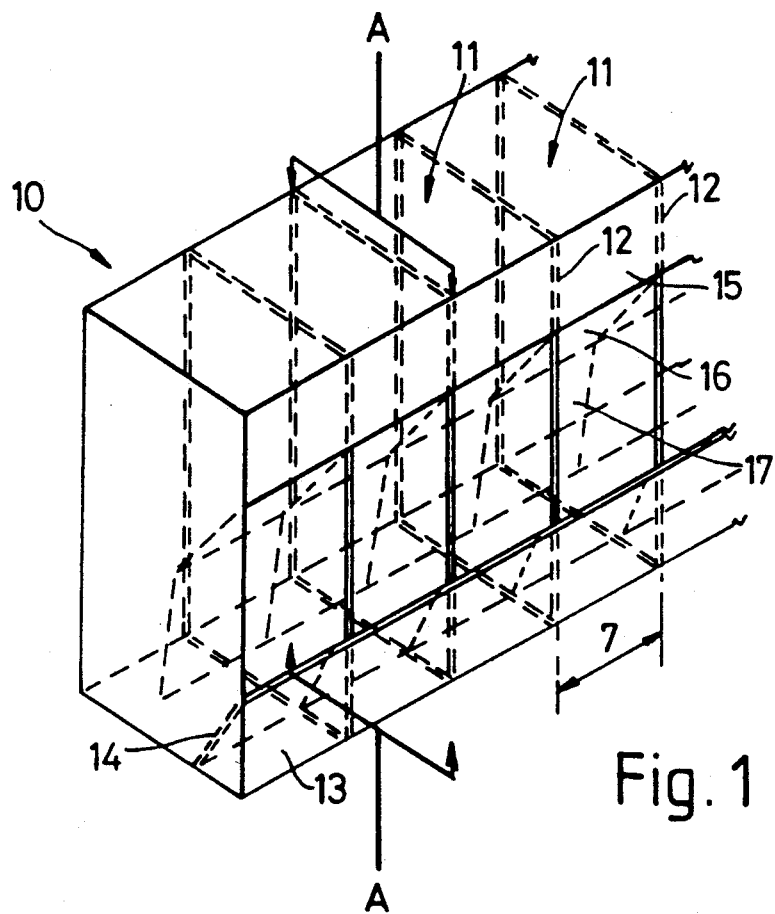
FIG. 1 is an isometric view from the front and to one side of a portion of a feeding trough according to the invention.

Referring to the drawings, the feeder trough 10 is an elongate member divided into compartments 11 by vertical partitions 12.

The trough has a front wall 13, and an inner front wall 14 which slopes downwards and inwards of the trough. The trough also has a canopy 15 which has an underside 16 sloping downwards and rearwards to meet a rear wall 17. The rear wall 17 terminates short of the floor 18 of the trough at a predetermined height above floor level.

Figure 2:
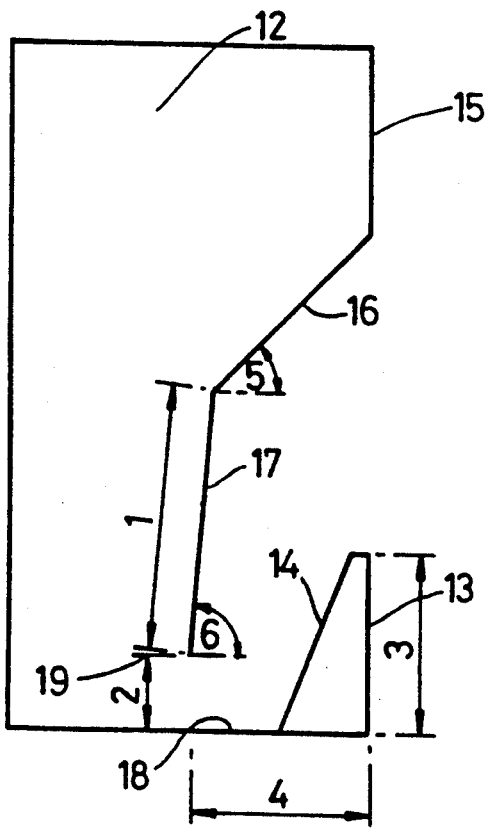
FIG. 2 is a sectional side elevation on the line A—A of FIG. 1 of the feeding trough.

The dimensions of the feeder trough are provided by a set of design criteria namely seven features which are labelled 1 to 7 on FIGS. 1 and 2 and six of which are ergonomically related to a selected group of pigs, as indicated in the following table:

| FEEDER DESIGN CRITERIA | | |
|---|---|---|
| 1. | Maximum nose to crown of largest pig | NC95 |
| 2. | Height of food off floor | H |
| 3. | Minimum brisket height of smallest pig | BH5 |
| 4. | Mean reach of mean weight of pig | RE50 |
| 5. | Mean neck angle of mean weight of pig | NA50 |
| 6. | Mean head angle of mean weight of pig | HA50 |
| 7. | Maximum shoulder width of largest pig | SW95 |

These feeder trough dimensions can be obtained from mathematical expressions relating to each of these six ergonomically related features as illustrated in FIG. 3 where W is the weight of a pig and H is the height of the feed above floor level. H is a known value and will remain substantially constant because as feed is consumed it is replaced from a reservoir behind the rear wall 17. These formulae are derived from regression analyses on logarithmic transformed body dimensions data, and represent an estimate of mean, plus or minus variations to accommodate pigs of same weight but slightly different dimensions. The dimensions obtained from their formulae allow scope for growth between upper and lower limits of the animals in the specified range.

Pigs weigh generally from 5 kg to 90 kg but in practice pigs within that wide range will not feed together; they will be divided into two or more ranges, these vary from country to country, but for example, ere may be three ranges, 5–15 kg, 15–30 kg and 30–90 kg. A feeder trough will therefore be designed to accommodate a group of pigs within a specific range.

While the feeding trough as hereinbefore described is designed for use by pigs it will be understood that the design criteria may be applied for other animals where problems arise through poor ergonomic feeder design or failure to appropriately constrain feeding and social behaviour.

I claim:

1. A feeding trough for a group of animals, the group having a predetermined largest animal, a predetermined smallest animal and a predetermined mean weight animal, the trough comprising an elongate trough member having a base which is at floor level; a front wall which extends from said floor level to a predetermined minimum brisket height of said predetermined smallest animal; an inner front wall which extends angularly downwards to terminate at the base; an inner rear wall which extends angularly downwards at a predetermined mean head angle of the mean weigh animal to terminate at a predetermined height above floor level at a predetermined means reach of the mean weight animal; a canopy overlying the trough member and extending inwards and downwards to meet the inner rear wall at a predetermined neck angle of the mean weight animal at a position equal to a predetermined maximum nose-to-crown length of the largest animal; and partitions spaced along the trough at intervals equal to a predetermined maximum shoulder width of the largest animal; wherein the group of animals is a group of pigs; and the respective dimensions are determined by the following formulae:

$$SW_{95}(mm) = 244.4 + 59.9(W^{0.34} - 4.08) + 1.96\sqrt{0.89^2 + (0.16(W^{0.34} - 4.08))^2}$$

$$BH_5(\text{mm}) = \left|239.6 + 10.20\left(\frac{H + 7.5W^{0.33}}{12W^{0.33}} - 3\right)\right|\left(\frac{W^{0.27}}{2.98}\right) -$$

$$196\sqrt{\left(2.47 \times \frac{W^{0.27}}{2.98}\right)^2 + \left[0.368\left(\frac{H + 7.5W^{0.33}}{12W^{0.33}} - 3\right)\right]\left(\frac{W^{0.27}}{2.98}\right)^2};$$

$$RE_{50}(\text{mm}) = \left[311.7 + 17.53\left(\frac{H + 7.5W^{0.33}}{12W^{0.33}} - 3\right)\right]\left(\frac{W^{0.42}}{5.85}\right);$$

$$NC_{95}(\text{mm}) = 234.4 + 90.1(W^{0.24} - 2.68) + 1.96\sqrt{2.38^2 + (4.83(W^{0.24} - 2.68))^2};$$

$$NA_{50}(°) = 34.5 - 8.04\left(\frac{H + 7.5W^{0.33}}{12W^{0.33}} - 3\right); \quad HA_{50}(°) = 78.5 - 4.15\left(\frac{H + 7.5W^{0.33}}{12W^{0.33}} - 3\right);$$

where $NC_{95}$ is the maximum nose to crown of the largest pig, $BH_5$ is the minimum brisket height of the smallest pig,
$RE_{50}$ is the mean reach of the mean weight pig,
$NA_{50}$ is the mean neck angle of the mean weight pig,
$HA_{50}$ is the mean head angle of the mean weight pig,
$SW_{95}$ is the maximum shoulder width of the largest pig,
W is the weight of the particular pig referred to in each respective formula, and
H is the height of the feed above the level of the base of the trough.

2. A feeding trough for a group of animals each having dimensions and a weight failing within a predetermined range, and each having a head; said feeding trough comprising an elongate trough member subdivided by vertical partitions spaced apart to define individual compartments each having a predetermined width, a front wall extending from a base of the trough and having a predetermined height over which the head of each animal can extend, and a rear wall land canopy defining a shape for restricting the space within each compartment into which the head of each animal can reach, wherein: said width, said height and said shape each correspond to a respective one of a plurality of statistically significant dimensions determined on the basis of a statistical analysis of said predetermined range of dimensions and weights; each of said animals has a shoulder width, and a brisket height; said group of animals has an animal having a largest shoulder width and an animal having a smallest brisket height, said shoulder width corresponding to one of said dimensions and said brisket height corresponding to a second one of said dimensions, and said plurality of statistically significant dimensions includes a shoulder width value for shoulder width approaching said largest shoulder width and a brisket height value for brisket height approaching said smallest brisket height, said shoulder width value for said shoulder width being said predetermined width and said brisket height value for said brisket height being said predetermined height.

3. A feeding trough according to claim 2, wherein said brisket height of the order of 95% of said animals of said group is larger than said brisket height value, said brisket height of the order of 5% of said animals of said group is smaller than said brisket height value, said shoulder width of the order of 95% of said animals of said group is less than shoulder width value, and said shoulder width of the order of 5% of said animals to be greater than said shoulder width value.

4. A feeding trough according to claim 2, wherein said vertical partitions of each of said individual compartments extend over all of a cross-sectional area of the space of said compartment bounded by said front wall, said rear wall and said canopy.

5. A feeding trough for a group of animals each having dimensions and a weight falling within a predetermined range, and each having a head, said feeding trough comprising an elongate trough member subdivided by vertical partitions spaced apart to define individual compartments each having a predetermined width, a front wall extending from a base of the trough and having a predetermined height over which the head of each animal can extend, and a rear wall and canopy defining a shape for restricting the space within each compartment into which the head of each animal can reach, wherein: said width, said height and said shape each correspond to a respective one of a plurality of statistically significant dimensions determined on the basis of a statistical analysis of said predetermined range of dimensions and weights; said shape defined by said rear wall and said canopy comprises a rear wall portion and a canopy portion, said canopy portion extending inwardly and downwardly of said trough at an angle with respect to the horizontal corresponding to a third one of said plurality of statistically significant dimensions, and terminating at said rear wall portion; said rear wall portion extending inwardly and downwardly of said trough to a terminal end by a distance corresponding to a fourth one of said statistically significant dimensions and at an angle to the horizontal corresponding to a fifth one of said statistically significant dimensions; said canopy portion having a length defined by said terminal end of said rear wall portion, the terminal end of said rear wall portion being at a maximum desired distance for a food height from said base of said trough and at a distance corresponding to a sixth one of said statistically significant dimensions in a horizontal direction from said front wall, wherein said animals of said group each have a neck angle, a head angle, a nose to crown length, and a reach distance, said statistical analysis involving determination of a mean weight animal having a mean neck angle, a mean head angle and a mean reach distance, one of said animals having a largest nose to crown length, wherein a further one of said statistically significant dimensions includes a nose to crown value approaching said largest nose to crown length, and wherein said third statistically significant dimension corresponds to said mean neck angle of said mean weight animal, said fourth statistically significant dimension corresponds to said further one of said statistically significant dimensions, said fifth statistically significant dimension corresponds to said mean head angle of said mean weight animal, and said sixth statistically significant dimension corresponds to said mean reach of said mean weight animal.

6. A feeding trough according to claim 5 wherein said nose to crown length of the order of 95% of said animals of said group is smaller than said nose to crown value, and said nose to crown length of the order of 5% of said animals of said group is greater than said nose to crown value.

* * * * *

UNITED STATES PATENT AND TRADEMARK OFFICE
CERTIFICATE OF CORRECTION

PATENT NO. : 5,176,104
DATED : January 5, 1993
INVENTOR(S) : MICHAEL R. BAXTER

It is certified that error appears in the above—identified patent and that said Letters Patent is hereby corrected as shown below:

Col. 2, line 52, delete "weigh" and insert - weight -

Col. 3, line 34, delete "failing" and insert - falling -

Col. 3, line 41, delete "land" and insert - and - (second occurrance)

Signed and Sealed this

Second Day of November, 1993

Attest:

BRUCE LEHMAN

Attesting Officer

Commissioner of Patents and Trademarks